T. E. Purchase,
Hook,
N°46,385.   Patented Feb. 14, 1865.
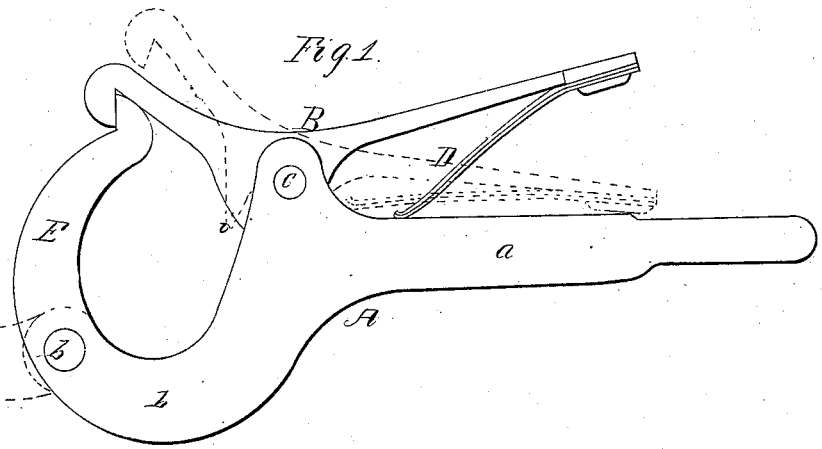
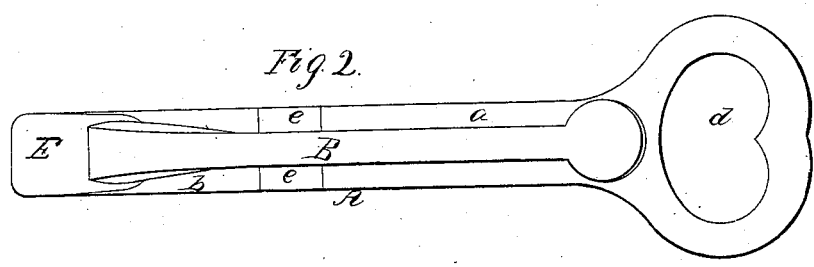
Witnesses
Chas B Price
W F Delany
Inventor
T. E. Purchase
By his attorney
H. Howson
per C. Thder

UNITED STATES PATENT OFFICE.

THOMAS E. PURCHASE, OF READING, PENNSYLVANIA.

IMPROVEMENT IN RETAINING AND RELEASING HOOKS.

Specification forming part of Letters Patent No. 46,385, dated February 14, 1865.

*To all whom it may concern:*

Be it known that I, T. E. PURCHASE, of Reading, Berks county, Pennsylvania, have invented an Improved Releasing and Retaining Hook; and I do hereby declare the following to be a full, clear, and exact description of the same, reference being had to the accompanying drawings, and to the letters of reference marked thereon.

My invention consists of a retaining and releasing hook to the body of which are connected a pawl and a spring-lever, the whole being constructed and arranged substantially as described hereinafter, so that the object retained by the hook may be instantly released on striking the said spring-lever.

In order to enable others to make and use my invention, I will now proceed to describe its construction and operation.

On reference to the accompanying drawings, which forms a part of this specification, Figure 1 is a side view of my improved retaining and releasing hook, and Fig. 2 a plan view of the same.

A is the body of the hook, and consists of the straight portion $a$, the curved portion $b$, and the two projections $e\ e$. The straight portion $a$ of the hook terminates in an eye, $d$, and between the projections $e\ e$ fits a lever, B, which is loosely jointed to the said projections by means of a pin, $c$. To the under side of the long arm of this lever is secured a spring, D, which bears upon the upper surface of the straight portion $a$ of the body of the hook, and has a tendency to maintain the lever in the position shown by black lines, Fig. 1. The short arm of the lever is rounded at its extreme end and is formed into a catch for bearing against that formed near the outer rounded end of the pawl E, which is jointed by a pin, $f$, to the outer end of the bent portion $b$ of the body of the hook, and which, when elevated to the position shown by black lines, forms a continuation of the said bent portion $b$. The short arm of the lever B cannot be depressed by the action of the spring D beyond a given point, owing to its projections $i$, which, when the pawl is open, as shown in red lines, bears against the body of the hook.

The above-described releasing and retaining hook may be applied with advantage to various uses. It is of especial utility, however, as a medium for hitching the drag-chain of horses employed in drawing heavy baggage and freight cars along railways, as it is of importance in many cases that the drag-chain should be unhitched in a moment.

The eye $v$ is connected to the cars and the drag-chain to the hook, the pawl E of the latter being held by the lever B. The release of the horses from the cars can be effected in a moment by the driver striking with his whip or with his hand the long arm of the lever B.

As the drag-chain bears against the pawl E, it is evident that the moment it is released by the striking of the lever the pawl must fly open and the drag chain must be at liberty.

It will be observed that the pawl can be readily locked to the lever by forcing the rounded end of the former against the rounded end of the short arm of the latter.

I claim as my invention and desire to secure by Letters Patent—

The within-described retaining-hook, consisting of the body A, pawl E, and spring-lever B, all constructed and arranged substantially as set forth.

In testimony whereof I have signed my name to this specification in the presence of two subscribing witnesses.

THOS. E. PURCHASE.

Witnesses:
   D. D. MAURER,
   R. G. HART.